United States Patent [19]

Kanemoto et al.

[11] Patent Number: 5,175,638
[45] Date of Patent: Dec. 29, 1992

[54] ECB TYPE LIQUID CRYSTAL DISPLAY DEVICE HAVING BIREFRINGENT LAYER WITH EQUAL REFRACTIVE INDEXES IN THE THICKNESS AND PLANE DIRECTIONS

[75] Inventors: Akihiko Kanemoto, Yokohama; Yasuyuki Takiguchi, Kawasaki; Haruo Iimura, Yokohama, all of Japan

[73] Assignee: Ricoh Company, Ltd., Tokyo, Japan

[21] Appl. No.: 887,381

[22] Filed: May 21, 1992

Related U.S. Application Data

[63] Continuation of Ser. No. 580,871, Sep. 11, 1990, abandoned.

[30] Foreign Application Priority Data

Sep. 12, 1989 [JP] Japan ............... 1-235964
Sep. 19, 1989 [JP] Japan ............... 1-243146
Nov. 6, 1989 [JP] Japan ............... 1-287417

[51] Int. Cl.$^5$ ............... G02F 1/133; G02F 1/137
[52] U.S. Cl. ............... 359/73; 359/63; 359/82; 359/93
[58] Field of Search ............... 350/347 E, 347 R, 335, 350/337, 339 R

[56] References Cited

U.S. PATENT DOCUMENTS

| | | | |
|---|---|---|---|
| 4,080,046 | 3/1978 | Nishizaki | 350/347 R |
| 4,385,806 | 5/1983 | Fergason | 359/73 |
| 4,443,065 | 4/1984 | Funada et al. | 359/93 |
| 4,466,702 | 8/1984 | Wiener-Avnear et al. | 350/347 R |
| 4,533,214 | 8/1985 | Penz et al. | 350/337 |
| 4,701,028 | 10/1987 | Clerc et al. | 350/347 E |
| 4,844,569 | 7/1989 | Wada et al. | 350/347 E |
| 4,904,058 | 2/1990 | Kato et al. | 359/53 |
| 4,909,606 | 3/1990 | Wada et al. | 359/73 |
| 4,936,654 | 6/1990 | Suzaki et al. | 350/347 E |
| 4,957,349 | 9/1990 | Clerc et al. | 350/347 R |
| 4,973,137 | 11/1990 | Kozaki et al. | 350/347 R |
| 4,984,873 | 1/1991 | Takiguchi et al. | 350/347 R |
| 4,995,704 | 2/1991 | Yamamoto et al. | 350/347 R |
| 5,016,988 | 5/1991 | Iimura | 350/347 R |
| 5,039,185 | 8/1991 | Uchida et al. | 359/93 |
| 5,056,896 | 10/1991 | Iimura et al. | 359/93 |
| 5,124,824 | 6/1992 | Kozaki et al. | 359/53 |

FOREIGN PATENT DOCUMENTS

| | | | |
|---|---|---|---|
| 0284372 | 9/1988 | European Pat. Off. | 350/347 R |
| 0311339 | 4/1989 | European Pat. Off. | |
| 0311405 | 4/1989 | European Pat. Off. | 350/347 R |
| 0312297 | 4/1989 | European Pat. Off. | 350/347 R |
| 0341702 | 11/1989 | European Pat. Off. | 350/347 R |
| 0128319 | 8/1982 | Japan | 350/345 |
| 0159117 | 7/1987 | Japan | 350/347 R |
| 0210934 | 8/1989 | Japan | 350/347 R |
| 0217315 | 8/1989 | Japan | 350/347 R |
| 1-219720 | 9/1989 | Japan | |
| 1-230025 | 9/1989 | Japan | |
| 1462978 | 1/1977 | United Kingdom | 350/347 R |

OTHER PUBLICATIONS

Iimura et al. "STN-LCD with Improved Viewing Angle Characteristics Using A Birefringent Film" SID 89 Digest-vol. XX-May 1989-pp. 398-401.

Primary Examiner—Andrew J. James
Assistant Examiner—Tai V. Duong
Attorney, Agent, or Firm—Oblon, Spivak, McClelland, Maier & Neustadt

[57] ABSTRACT

A liquid crystal display device including (1) a liquid crystal cell in which a liquid crystal layer with a liquid crystal composition having a positive dielectric anisotropy is sandwiched between a pair of substrates each having at least one electrode, and the liquid crystal molecules in the liquid crystal layer are homogeneously aligned between the substrates, (2) a pair of polarizers disposed so as to sandwich the liquid crystal cell therebetween and (3) at least one birefringent layer sandwiched between the liquid crystal layer and the polarizer, in which the maximum refractive index direction within the plane of the birefringent layer is substantially perpendicular to the aligning direction of the liquid crystal molecules. The device is excellent particularly in highly multiplexing driving characteristic as a black and white light shutter or a color display device.

4 Claims, 3 Drawing Sheets

ECB TYPE LIQUID CRYSTAL DISPLAY DEVICE HAVING BIREFRINGENT LAYER WITH EQUAL REFRACTIVE INDEXES IN THE THICKNESS AND PLANE DIRECTIONS

This application is a continuation of application Ser. No. 07/580,871, filed on Sep. 11, 1990.

BACKGROUND OF THE INVENTION

The present invention concerns a liquid crystal display device and, in more detail, it relates to an electrically controlled birefringence (ECB) type liquid crystal display device in which molecules of liquid crystal having a positive dielectric anisotropy are aligned substantially homogeneously and light modulation is carried out by utilizing the variation of birefringence rate in accordance with an electric field.

A so-called ECB type liquid crystal display device utilizing the electrically controlled birefringence effect comprises a liquid crystal cell in which a liquid crystal layer is sandwiched between upper and lower substrates such that molecules of liquid crystal are aligned homogeneously (i.e., aligned in parallel to the surface of the substrate when a voltage is not applied), and a pair of polarizers disposed on both outer sides of the liquid crystal cell such that the transmission axis or the absorption axis of the polarizer adjacent to the liquid crystal layer is displaced from the aligning direction of the liquid crystal molecules, so that the liquid crystal cell is colored by utilizing the birefringence of the liquid crystal molecules. Then, the display color of the device is varied by the substantial retardation change of the liquid crystal layer in accordance with the change of aligning state of the liquid crystal molecules when a voltage is applied to the liquid crystal layer.

For utilizing the conventional ECB type liquid crystal display device as a light shutter, that is, as a black and white type light modulation device, it is necessary to reduce the product of the refractive index anisotropy $\Delta n_L$ and the thickness $d_L$ of the liquid crystal layer ($\Delta n_L \cdot d_L$; retardation of the liquid crystal layer) to about 0.3 μm or less. However, since the change of the light transmittance in accordance with the applied voltage is remarkably decreased when the retardation of the liquid crystal layer is reduced, the device is not suitable for multiplexing driving and has a drawback that highly multiplexing driving thereof is substantially impossible.

On the other hand, in the STN type liquid crystal display device, there has been proposed a method of improving the black and white display of the device by further sandwiching, between the liquid crystal layer and the polarizer, a color-erasing liquid crystal cell in which liquid crystal molecules are twisted in the opposite direction (for instance, refer to H. Watanabe et. al; Society for Information Display 88, "Digest", pp:416–419 (1988), and Japanese Patent Laid Open Sho 64-519 (1989)). However, such a method has a drawback that the production steps for the device are complicated.

Further in the STN type liquid crystal display device, it has also been proposed to use a uniaxially stretched polymer film instead of the compensation cell as described above (for example, refer to H. Odai, et. al, 1988, "International Display Research Conference", pp:195–198). However, with such a method, the compensation is not complete and it is difficult to obtain an excellent black and white display device. Further Japanese Patent Laid Open Sho 62-210423 (1987) discloses use of a polymer film molded by a special method instead of the compensation cell in the ECB type liquid crystal display device of the DAP system. However, it is difficult by this method to produce films having homogeneous and predetermined birefringence.

The present inventors have made a study on the ECB type liquid crystal display device free from the foregoing drawbacks and, as a result, have found that black and white display having excellent multiplexing driving characteristic and excellent viewing angle property is obtained by sandwiching a birefringent layer having a predetermined retardation value between a liquid crystal layer and a polarizer such that the maximum refractive index direction within the plane of the birefringent layer is perpendicular to the aligning direction of the liquid crystal molecules in the liquid crystal layer. The present invention has been accomplished based on such a finding.

That is, it is an object of the present invention to provide an ECB type liquid crystal display device which does not have the foregoing drawbacks exhibited in the conventional black and white type ECB liquid crystal display device, is excellent in highly multiplexing driving characteristic, can be used suitably for a black and white light shutter or color display device and can be manufactured easily.

SUMMARY OF THE INVENTION

In a first aspect of the present invention, there is provided a liquid crystal display device comprising:

(1) a liquid crystal cell in which a liquid crystal layer comprising a liquid crystal composition having a positive dielectric anisotropy is sandwiched between a pair of substrates each having at least one electrode, and liquid crystal molecules in the liquid crystal layer are homogeneously aligned between both the substrates, (2) a pair of polarizers disposed so as to sandwich the liquid crystal cell therebetween, and (3) at least one birefringent layer sandwiched between the liquid crystal layer and at least one of both the polarizers, wherein
  (i) the transmission axes of both the polarizers are substantially perpendicular to each other,
  (ii) the maximum refractive index direction within the plane of the birefringent layer is substantially perpendicular to the aligning direction of the liquid crystal molecules in the liquid crystal layer and makes an angle of from 6° to 84° relative to the transmission axis or the absorption axis of the polarizer adjacent to the birefringent layer and, further,
  (iii) the product $\Delta n_L \cdot d_L$ of the refractive index anisotropy $\Delta n_L$ of the liquid crystal layer and the thickness $d_L$ of the liquid crystal layer, and the product $\Delta n_C \cdot d_C$ of the refractive index anisotropy $\Delta n_C$ within the plane of the birefringent layer and the thickness $d_C$ of the birefringent layer have the following relationship:

$$-0.1 \ \mu m < (\Delta n_L \cdot d_L - \Delta n_C \cdot d_C) \leq 0.27 \ \mu m$$

In a second aspect of the present invention, there is provided a liquid crystal display device comprising:

(1) a liquid crystal cell in which a liquid crystal layer comprising a liquid crystal composition having a positive dielectric anisotropy is sandwiched between a pair of substrates each having at least one electrode, and liquid crystal molecules in the liquid crystal layer are homogeneously aligned between both the substrates, (2) a pair of polarizers disposed so as to sandwich the liquid crystal cell therebetween, and (3) at least one birefringent layer sandwiched between the liquid crystal layer and at least one of both the polarizers, wherein
  (i) the transmission axes of both the polarizers are substantially perpendicular to each other,
  (ii) the maximum refractive index direction within the plane of the birefringent layer is substantially perpendicular to the aligning direction of the liquid crystal molecules in the liquid crystal layer and makes an angle of from 6° to 84° relative to the transmission axis or the absorption axis of the polarizer adjacent to the birefringent layer and, further,
  (iii) the product $\Delta n_L \cdot d_L$ of the refractive index anisotropy $\Delta n_L$ of the liquid crystal layer and the thickness $d_L$ of the liquid crystal layer, and the product $\Delta n_C \cdot d_C$ of the refractive index anisotropy $\Delta n_C$ within the plane of the birefringent layer and the thickness $d_C$ of the birefringent layer have the following relationship:

$$0.1 \ \mu m \leq (\Delta n_L \cdot d_L - \Delta n_C \cdot d_C) \leq 0.27 \ \mu m$$

In a third aspect of the present invention, there is provided a liquid crystal display device comprising:

(1) a liquid crystal cell in which a liquid crystal layer comprising a liquid crystal composition having a positive dielectric anisotropy is sandwiched between a pair of substrates each having at least one electrode, and liquid crystal molecules in the liquid crystal layer are homogeneously aligned between both the substrates, (2) a pair of polarizers disposed so as to sandwich the liquid crystal cell therebetween, and (3) at least one birefringent layer sandwiched between the liquid crystal layer and at least one of both the polarizers, wherein
  (i) the transmission axes of both the polarizers are substantially perpendicular to each other,
  (ii) the maximum refractive index direction within the plane of the birefringent layer is substantially perpendicular to the aligning direction of the liquid crystal molecules in the liquid crystal layer and makes an angle of from 6° to 84° relative to the transmission axis or the absorption axis of the polarizer adjacent to the birefringent layer and, further,
  (iii) the product $\Delta n_L \cdot d_L$ of the refractive index anisotropy $\Delta n_L$ of the liquid crystal layer and the thickness $d_L$ of the liquid crystal layer, and the product $\Delta n_C \cdot d_C$ of the refractive index anisotropy $\Delta n_C$ within the plane of the birefringent layer and the thickness $d_C$ of the birefringent layer have the following relationship:

$$-0.1 \ \mu m < (\Delta n_L \cdot d_L - \Delta n_C \cdot d_C) < 0.1 \ \mu m$$

In a fourth aspect of the present invention, there is provided a liquid crystal display device comprising:

(1) a liquid crystal cell in which a liquid crystal layer comprising a liquid crystal composition having a positive dielectric anisotropy is sandwiched between a pair of substrates each having at least one electrode, and liquid crystal molecules in the liquid crystal layer are homogeneously aligned between both the substrates, (2) a pair of polarizers disposed so as to sandwich the liquid crystal cell therebetween, and (3) at least one birefringent layer sandwiched between the liquid crystal layer and at least one of both the polarizers, wherein
  (i) the transmission axes of both the polarizers are substantially perpendicular to each other,
  (ii) the maximum refractive index direction within the plane of the birefringent layer is substantially perpendicular to the aligning direction of the liquid crystals molecules in the liquid crystal layer and makes an angle of from 6° to 84° relative to the transmission axis or the absorption axis of the polarizer adjacent to the birefringent layer,
  (iii) the refractive index $n_z$ of the birefringent layer in the direction perpendicular to the plane of the birefringent layer is substantially equal to the maximum refractive index $n_x$ within the plane of the birefringent layer and, further,
  (iv) the product $\Delta n_L \cdot d_L$ of the refractive index anisotropy $\Delta n_L$ of the liquid crystal layer and the thickness $d_L$ of the liquid crystal layer, and the product $\Delta n_C \cdot d_C$ of the refractive index anisotropy $\Delta n_C$ within the plane of the birefringent layer and the thickness $d_C$ of the birefringent layer have the following relationship:

$$-0.1 \ \mu m < (\Delta n_L \cdot d_L - \Delta n_C \cdot d_C) < 0.1 \ \mu m$$

DETAILED DESCRIPTION OF THE INVENTION

Figure 1:
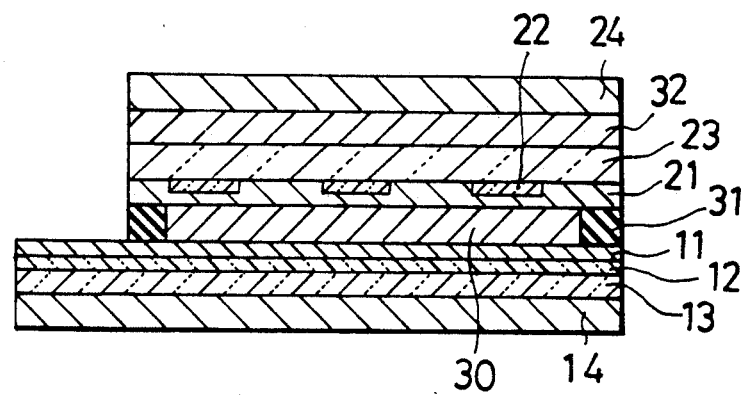
FIG. 1 is a cross sectional view illustrating a constitutional embodiment of a liquid crystal display device according to the present invention.

The present invention concerns a liquid crystal display device comprising:

(1) a liquid crystal cell in which a liquid crystal layer comprising a liquid crystal composition having a positive dielectric anisotropy is sandwiched between a pair of substrates each having at least one electrode, and liquid crystal molecules in the liquid crystal layer are homogeneously aligned between both the substrates, (2) a pair of polarizers disposed so as to sandwich the liquid crystal cell therebetween, and (3) at least one birefringent layer sandwiched between the liquid crystal layer and at least one of both the polarizers, wherein
  (i) the transmission axes of both the polarizers are substantially perpendicular to each other, (ii) the maximum refractive index direction within the plane of the birefringent layer is substantially perpendicular to the aligning direction of the liquid crystal molecules in the liquid crystal layer and makes an angle of from 6° to 84° relative to the transmission axis or the absorption axis of the polarizer adjacent to the birefringent layer and, further, (iii) the product $\Delta n_L \cdot d_L$ of the refractive index anisotropy $\Delta n_L$ of the liquid crystal layer and the thickness $d_L$ of the liquid, crystal layer, and the product $\Delta n_C \cdot d_C$ of the refractive index anisotropy $\Delta n_C$ within the plane of the birefringent layer and the thickness $d_C$ of the birefringent layer have the following relationship:

$$-0.1 \ \mu m < (\Delta n_L \cdot d_L - \Delta n_C \cdot d_C) \leq 0.27 \ \mu m$$

In the liquid crystal display device according to the present invention, if the difference between the retardation $\Delta n_L \cdot d_L$ of the liquid crystal layer and the retardation $\Delta n_C \cdot d_C$ of the birefringent layer is greater than 0.27 $\mu$m, the device is colored in the bright state owing to the birefringence.

In the liquid crystal display device according to the present invention, when the difference between the retardation $\Delta n_L \cdot d_L$ of the liquid crystal layer and the retardation $\Delta n_C \cdot d_C$ of the birefringent layer is smaller than 0.1 $\mu$m, the viewing angle property of the black and white display of the device can be improved remarkably by making the maximum refractive index $n_x$ within the plane of the birefringent layer substantially equal to the refractive index $n_z$ of the birefringent layer in the direction perpendicular to the plane of the birefringent layer. Further, when the difference between the retardations $\Delta n_L \cdot d_L$ and $\Delta n_C \cdot d_C$ is smaller than 0.1 $\mu$m, black and white display having satisfactory contrast can be obtained upon highly multiplexing driving of the device by making the retardation $\Delta n_L \cdot d_L$ of the liquid crystal layer not less than 1.05 $\mu$m.

In a case where a plurality of birefringent layers are superposed, the device has to be constituted such that the above-mentioned relationship is established between the retardation of the liquid crystal layer and the sum of the retardations of the respective birefringent layers. Also in a case of disposing birefringent layers on both outer sides of the liquid crystal layer, the device has to be constituted such that the maximum refractive index direction within the plane of each of the birefringent layers on both sides is substantially perpendicular to the aligning direction of the liquid crystal molecules in the liquid crystal layer and the above-mentioned relationship is established between the retardation of the liquid crystal layer and the sum of the retardations of the respective birefringent layers on both sides.

Further, in the liquid crystal display device according to the present invention, the angle made between the maximum refractive index direction within the plane of the birefringent layer and the transmission axis or absorption axis of a polarizer adjacent to the birefringent layer is, preferably, from 6° to 84° and, more preferably, from 30° to 60°.

With the constitution as described above, since the black and white display is enabled by the compensating effect of the birefringent layer and the retardation of the liquid crystal layer can be increased remarkably compared with the conventional case, the multiplexing driving characteristic can be improved remarkably.

It is necessary that the birefringent layer referred to in the present invention has a refractive index anisotropy and a light transparency. Specifically, there can be exemplified a stretched or extrusion molded film of each of polymers, for example, aromatic polymers such as polyester, polycarbonate, polyarylate, polyether ether ketone, polysulfone and polyether sulfone; polyolefin polymers such as polyethylene and polypropylene; vinylic polymers such as polyvinylidene chloride, polyvinyl alcohol, polystyrene and acrylic resin; cellulose and its derivatives such as regenerated cellulose (cellophane), diacetyl cellulose and triacetyl cellulose. In addition, there can be also exemplified slices of crystals of corundum, Chile nitre, tourmaline, mica, calcite and quartz which are cut out along a plane parallel to the optical axis.

The polymeric materials can be used with particular advantage since a layer of large area can be obtained with ease.

The birefringent layer is sandwiched between the liquid crystal layer and the polarizer on one side or both sides of the liquid crystal layer, but the layer may be a member separated from the liquid crystal cell by sandwiching it between a substrate of the liquid crystal cell and a polarizer, or it may be used in common with the substrate in the liquid crystal cell or may be constituted as a portion of the liquid crystal cell. When the birefringent layer is used as a substrate for the liquid crystal cell, increase of the thickness of the entire liquid crystal display device can be avoided and the optical loss due to the interfacial reflection can be minimized. Furthermore, the birefringent layer may be formed by vapor deposition, etc. on the substrate. Furthermore, the device may be constituted by using a film comprising a birefringent layer as a protection film for a polarizer. Further, similar effect described above can also be obtained by using a plurality of birefringent layers.

Further, the object of the present invention can also be attained by superposing the same liquid crystal cells as above, so that both the aligning directions of the liquid crystal molecules in the two liquid crystal cells are perpendicular to each other.

The present invention will now be described more specifically referring to the drawings.

FIG. 1 is a cross sectional view illustrating a constitutional embodiment of a liquid crystal display device according to the present invention. A liquid crystal layer 30 is sandwiched between both upper and lower substrates 13 and 23 on which transparent electrodes 12, 22 and aligning films 11, 21 are formed respectively, and isolated from the outside by a sealing material 31 to form a liquid crystal cell. Liquid crystal molecules of the liquid crystal layer 30 are aligned substantially in parallel to the surfaces of the substrates 13, 23 and homogeneously between the upper and lower substrates 13 and 23 by the aligning films 11, 21 when a voltage is not applied. The thickness of the liquid crystal layer 30 is controlled by scattered gap material such as plastic beads, glass rods or silica beads on the substrate 11 or 12 or mixing the gap material with the sealing material 31, or by printing a solution of a resin and the like on the substrate and then forming a recess by drying or heating.

Polarizers 14 and 24 are disposed on the outermost sides of the liquid crystal cell formed as described above. In this constituent embodiment, a birefringent layer 32 having the above-mentioned feature is sandwiched between the upper polarizer 24 and the upper substrate 23. The embodiment is given merely as an example and the present invention is not limited only to this constitutional embodiment and further, various changes or modifications of the constitution are possible. For instance, the birefringent layer may be sandwiched between the lower polarizer 14 and the lower substrate 13, or a plurality of birefringent layers may be used for obtaining the similar effect as has been described above.

Figure 2:
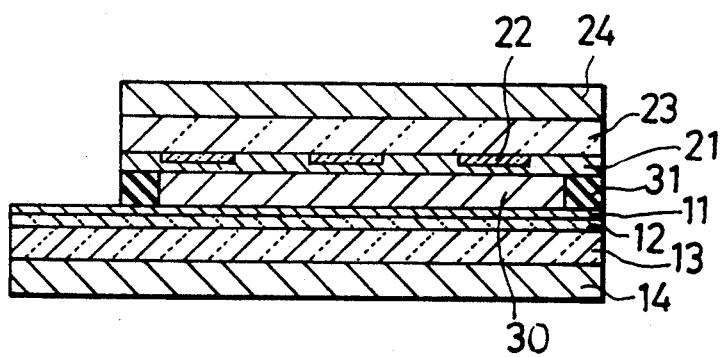
FIG. 2 is a cross sectional view illustrating another constitutional embodiment of a liquid crystal display device according to the present invention.
Figure 3:
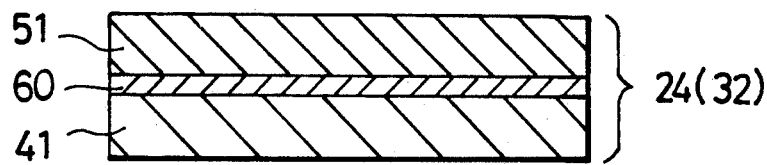
FIG. 3 is a cross sectional view illustrating the structure of a polarizer shown in FIG. 2.

FIG. 2 is a cross sectional view illustrating another embodiment of a liquid crystal display device according to the present invention, in which the same reference numerals as those in FIG. 1 are given to components similar to those in FIG. 1. As far as FIG. 2 is concerned, the embodiment has the same constitution as that of the conventional liquid crystal device in appearance, but the structure of the polarizer 24 is different from that of the conventional structure. That is, as shown in FIG. 3, the polarizer 24 has a structure in which a dichroic film 60 is sandwiched between two substrates (protection films) 51 and 41 for the polarizer, and the substrate 41 on the liquid crystal layer side serves also as a birefringent layer. With such a constitution, the same effect as described above can be obtained.

Figure 5:
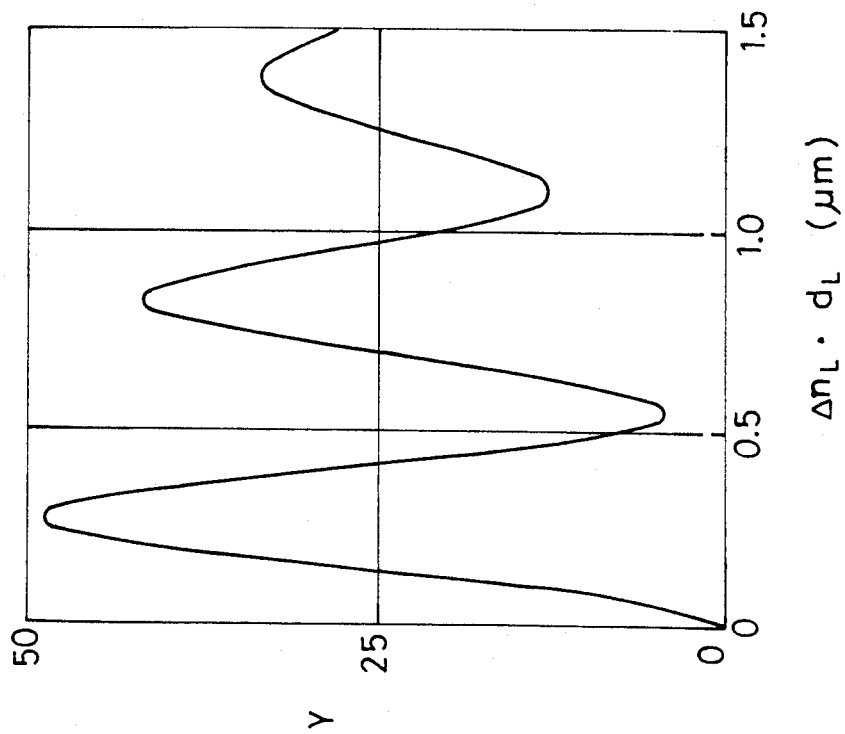
FIG. 5 is a graph showing the change of brightness Y depending on retardation $\Delta n_L \cdot d_L$ in the conventional ECB type liquid crystal display device.
Figure 4:
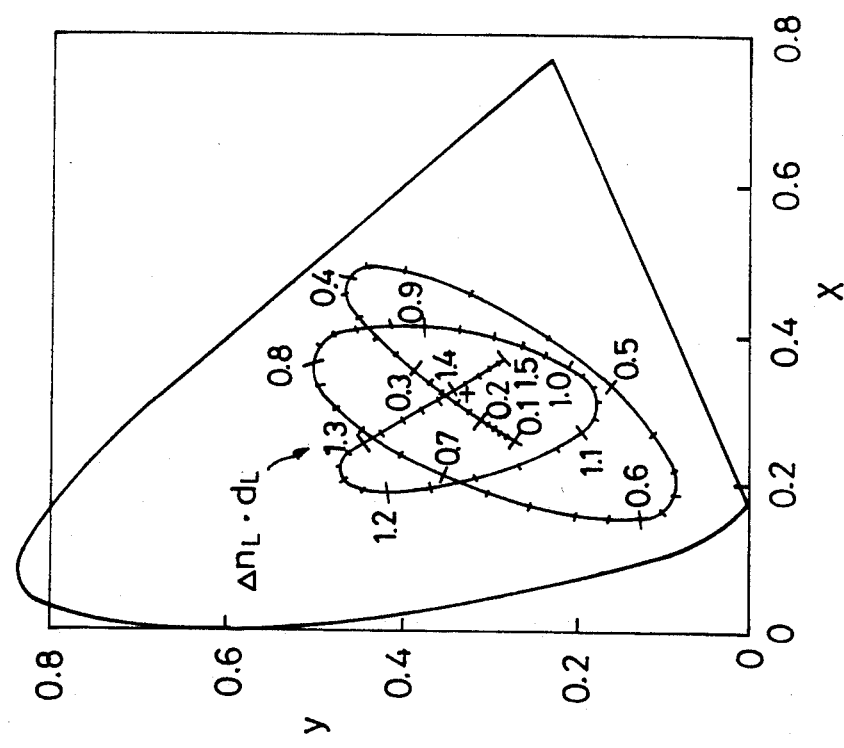
FIG. 4 is a view showing a chromaticity diagram for a conventional ECB type liquid crystal display device.

The chromaticity diagram (x,y) for the color of transmission light or reflection light and the change of the brightness Y depending on the retardation $\Delta n_L \cdot d_L$ in the conventional ECB type liquid crystal display device are shown in FIG. 4 and FIG. 5 respectively. In this embodiment, upper and lower polarizers are arranged in a crossed nicol state and the angle between the aligning direction of the liquid crystal molecules and the transmission axis of the polarizer adjacent to the liquid crystal layer is 45°. For using the conventional ECB type liquid crystal display device as a white and black type light shutter, it is preferred that the color at each of the selected point and the non-selected point is close upon white or black and there is a great difference between brightnesses at the selected point and the non-selected point. For this purpose, in the conventional ECB type liquid crystal display device, the value for $\Delta n_L \cdot d_L$ has to be set near a point showing white color in FIG. 4 (the point at the position of x=0.333 and y=0.333, indicated by the symbol "+"). Further, in FIG. 5, $\Delta n_L \cdot d_L$ has to be set such that a difference between a brightness $Y_{NX}$ at a retardation ($\Delta n_L \cdot d_L$) (brightness at a non-selected point) and a brightness $Y_S$ at a retardation ($\Delta n_L \cdot d_L - \delta$) reduced by the application of a voltage (brightness at a selected point) is made greater ($\delta > 0$; $\delta$ depends on the multiplexing ratio and the kind of the liquid crystal). Accordingly, $\Delta n_L \cdot d_L$ has to be set to about 0.27 μm in view of FIG. 4 and FIG. 5. However, if $\Delta n_L \cdot d_L$ is set to such a small value, the voltage-dependent change of the brightness near a threshold voltage is reduced and no sufficient contrast can be obtained at highly multiplexing driving.

Thus, when it is intended to conduct a white and black type light shutter operation in the conventional ECB type liquid crystal display device, since the value for the retardation $\Delta n_L \cdot d_L$ of the liquid crystal layer is limited and, in addition, since the retardation of the liquid crystal layer varies depending on the viewing angle direction, the background color is changed and the contrast is reduced when viewed from an oblique direction.

Therefore, in the constitution of the liquid crystal display device according to the present invention, when a birefringent layer is sandwiched between a liquid crystal layer and a polarizer such that the maximum refractive index direction within the plane of the birefringent layer is perpendicular to the aligning direction of the liquid crystal molecules, the transmission axes of both the polarizers are made perpendicular to each other and the retardation of the liquid crystal layer is made greater by from 0.1 to 0.27 μm than the retardation of the birefringent layer, the entire retardation of the liquid crystal layer and the birefringent layer becomes from 0.1 to 0.27 μm, a black and white display is realized and the value itself of the retardation of the liquid crystal layer is free from restriction. Accordingly, since the retardation $\Delta n_L \cdot d_L$ of the liquid crystal layer can be made much greater than 0.27 μm as described above in this case, the change of the retardation of the liquid crystal layer corresponding to the voltage becomes steep thus making it possible for highly multiplexing driving. Furthermore, when the difference between the retardation of the liquid crystal layer and the retardation of the birefringent layer is within a range from 0.13 to 0.25 μm, further excellent black and white display can be obtained.

On the other hand, also when a birefringent layer having a difference of smaller than 0.1 μm between both the retardations of the birefringent layer and the liquid crystal layer is sandwiched between the liquid crystal layer and the polarizer such that the maximum refractive index direction within the plane of the birefringent layer is substantially perpendicular to the aligning direction of the liquid crystal molecules in the liquid crystal display device according to the present invention, black and white display can be realized by restoring the state of polarization changed by the liquid crystal layer to the original state. In FIG. 1, when light enters from below, the light after passing though the lower polarizer 14 shows linear polarization and then enters the liquid crystal layer 30. The refractive index is greater and the phase velocity is smaller in the direction of the long axis of the liquid crystal molecules (aligning direction), while the refractive index is smaller and the phase velocity is greater in the direction of the short axis of the liquid crystal molecules. Accordingly, when the light passes through the liquid crystal layer 30, a phase difference of $2\pi \Delta n_L \cdot d_L / \lambda$ is formed between oscillating components in the above two directions. $\lambda$ indicates the wavelength of the light. Since the phase difference between the two components is changed corresponding to the wavelength, the light after passing through the liquid crystal layer shows different state of polarization corresponding to the wavelength. Therefore, when the light is passed through the polarizer next to the liquid crystal layer as in the usual ECB type liquid crystal display device, the transmittance is changed corresponding to the wavelength to provide colored display. In the present invention, the light after passing through the liquid crystal layer enters the birefringent layer 32 disposed such that the maximum refractive index direction within the plane of the birefringent layer 32 is perpendicular to the aligning direction of the liquid crystal molecules. Then, among the two oscillating components described above, the component in the direction in which the phase is delayed (the aligning direction), is transmitted in the minimum refractive index direction within the plane of the birefringent layer 32, while the component in the direction in which the phase is advanced (direction perpendicular to the aligning direction), is transmitted in the maximum refractive index direction within the plane of the birefringent layer 32.

Accordingly, the phase of component delayed by the passage through the liquid crystal layer 30 is advanced in the birefringent layer 32, while the phase of component advanced by the passage through the liquid crystal layer 30 is delayed in the birefringent layer 32. Therefore, if the phase difference $2\pi \Delta n_L \cdot d_L/\lambda$ formed in the liquid crystal layer 30 is equal to the phase difference $2\pi \Delta n_C \cdot d_C/\lambda$ formed in the birefringent layer 32, the state of light after passing through the birefringent layer 32 is returned to the state (linear polarization) before the light has entered the liquid crystal layer 30. Accordingly, if the difference between both the retardations is smaller than 0.1 μm as described above, the color of the liquid crystal display device without voltage application is white (the transmission axes of both upper and lower polarizers are parallel to each other) or black (the transmission axes of both upper and lower polarizers are perpendicular to each other).

When such a liquid crystal display device is subjected to multiplexing driving, a voltage near a threshold voltage is applied to the liquid crystal layer at the time of non-selection and as a result, the retardation value of the liquid crystal layer becomes smaller than the retardation $\Delta n_L \cdot d_L$ without voltage application. Accordingly, for canceling the phase difference formed in the liquid crystal layer upon multiplexing driving, it is necessary to make the retardation $\Delta n_C \cdot d_C$ of the birefringent layer somewhat smaller than $\Delta n_L \cdot d_L$.

When the difference between both the retardations of the liquid crystal layer and the birefringent layer is smaller than 0.1 μm in the liquid crystal display device according to the present invention, since the phase difference formed in the liquid crystal layer is canceled by the opposite phase difference in the birefringent layer under the state of not applying the voltage, the entire phase difference is reduced to 0, and the state of polarization is equivalent to that in the case of $\Delta n_L \cdot d_L = 0$ as shown in FIG. 4 and FIG. 5. Further, when a voltage is applied, the retardation of the liquid crystal layer is reduced and the $\Delta n_L \cdot d_L$ is made smaller than $\Delta n_C \cdot d_C$, so that the entire retardation becomes a difference δ between $\Delta n_L \cdot d_L$ and $\Delta n_C \cdot d_C$.

Accordingly, the state of polarization under the application of voltage is equal to that in the case of $\Delta n_L \cdot d_L = \delta$ in FIG. 4 and FIG. 5.

As has been described above, the liquid crystal display device according to the present invention can realize the same black and white display as that in the conventional ECB type liquid crystal display device, also when the difference between both the retardations is set smaller than 0.1 μm. In addition, in the conventional ECB type liquid crystal display device, the value of the retardation of the liquid crystal layer has to be limited to a small value in order to realize the black and white display. On the other hand, in the liquid crystal display device according to the present invention, since there is no requirement for limiting the retardation value of the liquid crystal layer, it is possible to increase the retardation value of the liquid crystal layer, so that display having good contrast can be attained also upon highly multiplexing driving.

Figure 6:
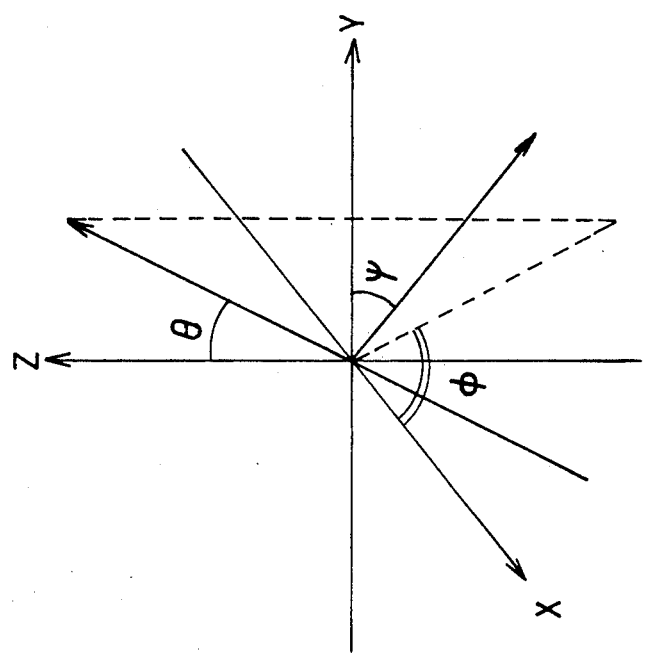
FIG. 6 is a view showing the definition for the direction of viewing angle.

In addition, when the difference between both the retardations of the liquid crystal layer and the birefringent layer is smaller than 0.1 μm, since the brightness Y of the liquid crystal display device approaches zero as can be seen from FIG. 5, it is preferred to reduce the change of the background color depending on the viewing angle by using such a birefringent layer that the refractive index $n_z$ of the birefringent layer in the direction perpendicular to the plane of the birefringent layer is substantially equal to the maximum refractive index $n_x$ within the plane. For explaining the viewing angle property of the liquid crystal display device according to the present invention when the difference between both the retardations is smaller than 0.1 μm and $n_z$ is equal to $n_x$, the definition for the viewing angle direction is shown in FIG. 6. In FIG. 6, plane XY is parallel to the plane of the device, direction Z is perpendicular to the plane of the device, direction X represents the aligning direction of the liquid crystal molecules projected on the plane of the device and direction Y is perpendicular to the direction X. The viewing angle direction is defined with an angle θ from the direction Z and an angle φ from the direction X.

The extent of the birefringence in a case where light enters obliquely to the liquid crystal layer is given as a difference between both lengths of a long axis and a short axis of an ellipse formed by cutting a refractive index ellipsoid having an axis in the direction of the long axis of the liquid crystal molecule (refractive index $n_e$ in the long axis direction and refractive index $n_0$ in the short axis direction), along a plane which is perpendicular to the light incident direction and passes through the center of the ellipsoid. The phase velocity of the component oscillating in the long axis direction of the ellipse is slow, while the phase velocity in the short axis direction is fast. The retardation $R_L$ of the liquid crystal layer in this case is defined as a product of the degree of the birefringence and the optical path length in the liquid crystal layer and, where the tilt angle is 0°, in particular, the retardation $R_L$ in the directions of $\phi = 0°$ and $\phi = 90°$ can be expressed by the following equations (1) and (2).

$$\phi = 0°: R_L(\theta) = (d_L/\cos\theta) \cdot |(\cos^2\theta/n_e^2 + \sin^2\theta/n_o^2)^{-\frac{1}{2}} - n_o| \quad (1)$$
$$\phi = 90°: R_L(\theta) = (d_L/\cos\theta) \cdot (n_e - n_o) \quad (2)$$

Figure 7:
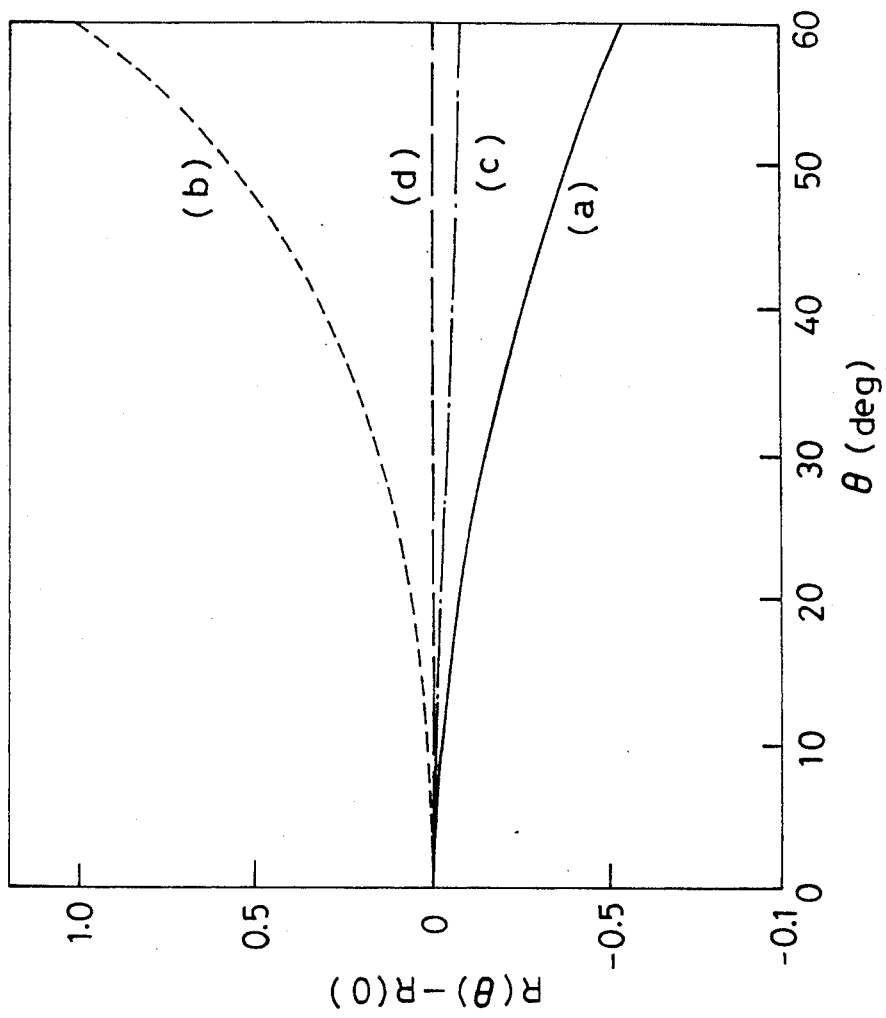
FIG. 7 is a graph showing the viewing angle dependency of retardations in the conventional ECB type liquid crystal display device and the liquid crystal display device according to the present invention.

Accordingly, the θ dependency of the difference between the retardation R (θ) upon oblique incidence of light, that is, $R_L$ (θ) and the retardation R (O) upon vertical incidence of light, that is, $R_L$ (O) in the conventional ECB type liquid crystal display device is illustrated by (a) $\phi = 0°$ and (b) $\phi = 90°$ in FIG. 7. In this embodiment, the refractive index of the liquid crystal and the thickness of the liquid crystal layer are defined as $n_e = 1.6$, $n_o = 1.5$ and $d_L = 10$ μm. As shown in FIG. 7, when the viewing angle θ is increased, since the difference of the retardation is greatly deviated from the value upon vertical incidence of light, the background color changes greatly from the color when viewed from the front.

On the contrary, in the liquid crystal display device according to the present invention, when the difference between both the retardations is set smaller than 0.1 μm and a birefringent layer having $n_z$ substantially equal to $n_x$ is disposed such that the maximum refractive index direction within the plane (direction X) is substantially perpendicular to the aligning direction of the liquid crystal molecules, the direction X coincides with the direction Y in FIG. 6, while the direction Y coincides with the direction X in FIG. 6. A transmission axis or an absorption axis of the polarizer adjacent to the birefringent layer is shown in a direction P, which forms an angle Ψ of from 6° to 84° and preferably 30° to 60° with the direction of the maximum refractive index within the plane (direction Y in FIG. 6). Accordingly, the retardation $R_c$ of the birefringent layer in the direction of $\phi=0°$ and $\phi=90°$ can be expressed by the following equations (3) and (4).

$$\phi = 0°: R_c(\theta) = (d_c/\cos\theta) \cdot |(n_x - (\cos^2\theta/n_y^2 + \sin^2\theta/n_x^2)^{-\frac{1}{2}}| \quad (3)$$
$$\phi = 90°: R_c(\theta) = (d_c/\cos\theta) \cdot (n_x - n_y) \quad (4)$$

In the liquid crystal layer, the long axis of an ellipse vertical to the incident light in the direction of $\phi=0°$ is present within the plane XZ, while the short axis coincides with the direction Y. On the other hand, in the birefringent layer, the long axis of the ellipse vertical to the incident light in the direction of $\phi=0°$ coincides with the direction Y, while the short axis is present within the plane XZ. The same relationship as above is established also in the direction of $\phi=90°$. Accordingly, the birefringent layer serves to restore the phase of the polarization varied in the liquid crystal layer to the original state. In particular, in the direction of $\phi=90°$, if the retardation $d_L \cdot (n_e - n_o)$ of the liquid crystal layer is equal to the retardation $d_c \cdot (n_x - n_y)$ of the birefringent layer when the light enters vertically to the device plane, the change of the state of polarization in the liquid crystal layer upon oblique incidence of light can be completely restored to the original state by the birefringent layer. The $\theta$ dependencies of the differences in cases of $\phi=0°$ and $\phi=90°$ between the retardation $R_L(\theta) - R_C(\theta)$ upon oblique incidence of light and the retardation $R_L(O) - R_C(O)$ upon vertical incidence of light in the liquid crystal display device according to the present invention are shown respectively at (c) ($\phi=0°$) and (d) ($\phi=90°$) in FIG. 7. The refractive index and the thickness of the birefringent layer are defined as $n_x=1.6$, $n_y=1.5$, $n_z=1.6$ and $d_C=10$ μm. As apparent from FIG. 7, in the case of the liquid crystal display device according to the present invention, even if the viewing angle $\theta$ is increased, since the difference between the retardations does not greatly deviate from the value upon vertical incidence, the viewing angle dependency of background color is small.

As has been described above, in the ECB type liquid crystal display device according to the present invention, when the difference between both the retardations is smaller than 0.1 μm and $n_z$ is equal to $n_x$ in the birefringent layer, a sufficient contrast can be obtained also upon highly multiplexing driving and the change of the background color depending on the viewing angle is also small.

As has been described above specifically, in the ECB type liquid crystal display device according to the present invention, since a birefringent layer having a predetermined retardation value is sandwiched between a liquid crystal layer and at least one of a pair of polarizers sandwiching the liquid crystal layer therebetween such that the maximum refractive index direction within the plane of the birefringent layer is perpendicular to the aligning direction of the liquid crystal molecules in the liquid crystal layer, the highly multiplexing driving characteristic of the device is remarkably improved and the viewing angle property is more excellent than that of the conventional STN type device with a compensation cell.

The present invention will now be explained referring to examples but it should be understood that the present invention is no way limited only to these examples.

EXAMPLE 1

An aligning agent HL-1110 manufactured by Hitachi Kasei Co. was applied by using a spinner to two glass substrates each having a patterned transparent electrode, and dried in an oven at 120° C. to form an aligning film, which was thereafter subjected to rubbing treatment.

The two substrates were joined together such that both rubbing directions were antiparallel to each other, and liquid crystal ZLI-2293 manufactured by Merck Co. having a positive dielectric anisotropy was enclosed therebetween. The thickness of the liquid crystal layer was controlled by inserting mylar spacers between the substrates upon junction of the substrates, to prepare two sets of cells in which the retardation values of the liquid crystal layers were 1.16 μm and 0.91 μm respectively. Then, one of the two sets of cells was superposed on the other such that the rubbing direction in the one was perpendicular to that in the other, and two polarization plates were disposed so as to sandwich the superposed cells therebetween such that their transmission axes were perpendicular to each other to obtain a liquid crystal display device. In this case, the transmission axis of the polarization plate made the angle of 45° relative to the rubbing direction of the liquid crystal cell. In the liquid crystal display device thus manufactured, when the change of display color was observed by applying a voltage to one of the liquid crystal cells (provided with electrodes) having the retardation of 1.16 μm, the display color was substantially white when the voltage was not applied and turned black at a voltage slightly higher than the threshold voltage. Further, the steepness $\gamma$ represented by the ratio between the voltage $V_{50}$ at which the relative transmittance of the liquid crystal display device is changed by 50% and a voltage $V_{10}$ at which the relative transmittance is changed by 10% ($V_{50}/V_{10}$) (hereinafter simply referred to as the steepness $\gamma$) was 1.15 and it was confirmed that the steepness was improved and the multiplexing driving characteristic was excellent as compared with a comparative example described later.

EXAMPLE 2

A polymer film having the retardation value of 1.54 μm was superposed on a liquid crystal cell (provided with electrodes) having the retardation value of 1.79 μm which was made greater by 0.25 μm than the former such that the maximum refractive index direction within the plane of the polymer film was perpendicular to the aligning direction of the liquid crystal molecules in the liquid crystal cell, and then, the superposed components were sandwiched between the polarization plates in the same manner as Example 1, to manufacture a liquid crystal display device. The steepness $\gamma$ of the device was 1.09 and it was confirmed that the steepness was further improved than that in Example 1.

COMPARATIVE EXAMPLE 1

A liquid crystal cell was manufactured by using the same materials as those in Example 1 such that the retardation value was 0.25 μm, and the cell was sandwiched between polarization plates arranged in a crossed nicol state such that each of the transmission axes of the polarization plates made the angle of 45° relative to the aligning direction of the liquid crystal molecules, to obtain a liquid crystal display device of Comparative Example 1. The steepness γ of the device was 1.34 and the multiplexing driving characteristic was poor.

EXAMPLE 3

A polyimide film for aligning was formed on each of two glass substrates each provided with a stripe-like transparent electrode and then subjected to rubbing treatment. Subsequently, the treated substrates were joined together, and nematic liquid crystal ZLI 2293 having a positive dielectric anisotropy (manufactured by Merck Co.) was enclosed therebetween to prepare two sets of liquid crystal cells. Each of the two sets of liquid crystal cells had a retardation value of about 1.16 μm.

One of the two sets of liquid crystal cells was superposed on the other such that the aligning directions of the liquid crystal molecules in the respective liquid crystal layers were perpendicular to each other, and the superposed cells were sandwiched between a pair of polarization plates, to prepare a liquid crystal display device. Then, a voltage was applied to the thus manufactured liquid crystal display device and the display color was observed. In a case where the directions of polarization plates were set such that the angle $\beta$ between the transmission axes of the upper and lower polarization plates (hereinafter simply referred to as $\Delta\beta$) was 90° and the angle $\beta m$ between the transmission axis of the polarization plate and the aligning direction of the liquid crystal molecules (hereinafter simply referred to as $\beta m$) was 45°, the display color was black when the voltage was not applied, turned white near the threshold voltage and, further, the display color changed successively as yellow, red, purple and blue corresponding to the increase of voltage.

Then, it was confirmed that the steepness γ of the liquid crystal display device in this embodiment was 1.148 (which was smaller as compared with γ of the conventional ECB type liquid crystal display device to be described later) and the multiplexing driving characteristic was excellent.

EXAMPLE 4

A uniaxially stretched polymer film was superposed as a birefringent layer on a liquid crystal cell manufactured in the same manner as in Example 3 such that the maximum refractive index direction within the film plane was perpendicular to the aligning direction of the liquid crystal molecules, and the superposed components were sandwiched between a pair of polarization plates to form a liquid crystal display device of Example 4 according to the present invention. Since the retardation of the liquid crystal cells was 1.81 μm, the thickness of the uniaxially stretched polymer film was controlled such that the retardation of the film was also 1.81 μm.

The steepness γ of this device was 1.093 when the device was set in the same manner as Example 3 such that $\Delta\beta$ was 90° and $\beta m$ was 45° and it was confirmed that the multiplexing driving characteristic was excellent.

COMPARATIVE EXAMPLE 2

A liquid crystal cell was manufactured in the same manner as in Example 3 such that the retardation of the liquid crystal layer was 0.27 μm. Upper and lower polarization plates were disposed respectively on both outer sides of the liquid crystal cell such that $\Delta\beta$ was 90° and $\beta m$ was 45°, to form a liquid crystal display device as Comparative Example 2. The steepness γ of the device was 1.336 and no sufficient contrast was obtained upon highly multiplexing driving.

EXAMPLE 5

A polyimide film for aligning was formed on each of two glass substrates each provided with a stripe-like transparent electrode and then subjected to rubbing treatment. Subsequently, the two treated substrates were joined together via a spacer, and nematic liquid crystal ZLI 2293 having a positive dielectric anisotropy (manufactured by Merck Co.) was enclosed therebetween. The retardation of the liquid crystal layer was 1.16 μm when light entered perpendicularly to the cell plane.

Then, corundum ($n_e = 1.76$, $n_o = 1.768$) which was cut out along a plane parallel to the optical axis direction, was superposed as a birefringent plate on the liquid crystal cell, and the superposed components were sandwiched between a pair of polarization plates to form an ECB type liquid crystal display device. In this case, the product of the thickness and the refractive index anisotropy of corundum was 1.16 μm. The optical axis of corundum was disposed so as to be parallel to the aligning direction of the liquid crystal molecules. Further, the polarization plates were arranged such that $\Delta\beta$ was 90° and $\beta m$ was 45°.

When a voltage was applied to the liquid crystal display device obtained in this way and the display color was observed, the display color was black at a voltage below a threshold, turned white near the threshold voltage and, further, changed successively as yellow, red, purple and blue corresponding to the increase of voltage.

Then, it was confirmed that the steepness γ of the liquid crystal display device in this embodiment was 1.148 (which was smaller as compared with γ of the conventional ECB type liquid crystal display device to be described later) and the multiplexing driving characteristic was excellent.

Further, when the liquid crystal display device of this embodiment was subjected to multiplexing driving and the viewing angle dependency of the non-selected picture element was observed, it was confirmed that light leakage when viewed from an oblique direction was greatly reduced as compared with the conventional ECB type liquid crystal display device and the viewing angle dependency of the contrast was also improved remarkably as compared with the conventional device.

EXAMPLE 6

Tourmaline ($n_e = 1.638$, $n_o = 1.669$) which was cut out along a plane parallel to the optical axis direction was superposed as a birefringent plate on a liquid crystal cell manufactured in the same manner as in Example 5, and the superposed components were sandwiched between a pair of polarization plates, to form an ECB type liquid crystal display device. The retardation of the liquid crystal layer was 1.81 μm and the product of the thickness and the refractive index anisotropy of the tourmaline was set to 1.81 μm. Further, the optical axis of tourmaline was disposed so as to be parallel to the aligning direction of the liquid crystal molecules and the polarization plates were set in the directions of $\Delta\beta = 90°$ and $\beta m = 45°$.

The steepness γ of the device was 1.093 and it was confirmed that the multiplexing driving characteristic was excellent. Further, as a result of examining the viewing angle property in the same way as in Example 5, the viewing angle dependency of the contrast was also excellent.

COMPARATIVE EXAMPLE 3

A liquid crystal cell was manufactured in the same manner as in Example 5 such that the retardation of the liquid crystal layer was 0.27 μm. The liquid crystal cell was sandwiched between upper and lower polarization plates such that $\Delta\beta$ was 90° and $\beta m$ was 45°, to form a liquid crystal display device. The steepness $\gamma$ of the device was 1.336 and no sufficient contrast could be obtained upon highly multiplexing driving. Further, when the non-selected picture elements were viewed from an oblique direction, light leakage was remarkable and the contrast was changed greatly depending on the viewing angle direction.

What is claimed is:

1. A liquid crystal display device, which can be operated upon highly multiplexing driving with a good viewing angle properties, comprising:
    a liquid crystal cell in which a liquid crystal layer comprising a liquid crystal composition having a positive dielectric anisotropy is sandwiched between a pair of substrates each having at least one electrode, and molecules in the liquid crystal layer are homogeneously aligned between the substrates;
    a pair of polarizers disposed so as to sandwich the liquid crystal cell therebetween; and
    at least on birefringent layer sandwiched between the liquid crystal layer and at least one of the polarizers;
    wherein transmission axes of the polarizers are substantially perpendicular to each other;
    a maximum refractive index direction within a plane of the birefringent layer is substantially perpendicular to an aligned direction of the molecules in the liquid crystal layer and makes an angle of 30° to 60° relative to a transmission axis or an absorption axis of the polarizer adjacent to the birefringent layer;
    a refractive index $n_z$ of the birefringent layer in a direction perpendicular to a plane of the birefringent layer is substantially equal to a maximum refractive index $n_x$ within the plane of birefringent layer; and
    a product, $\Delta n_L \cdot d_L$, of a refractive index anisotropy within a plane of the liquid crystal layer, $\Delta n_L$, and a thickness of the liquid crystal layer, $d_L$, and a product, $\Delta n_C \cdot d_C$, of a refractive index anisotropy within the plane of the birefringent layer, $\Delta n_C$, and the thickness of the birefringent layer, $d_C$, have the following relationship:

$$0.13 \ \mu m < (\Delta n_L \cdot d_L - \Delta n_C \cdot d_C) \leqq 0.25 \ \mu m.$$

2. A device according to claim 1, wherein at least one of the birefringent layers is sandwiched between the liquid crystal cell and at least one of the polarizers.

3. A device according to claim 1, wherein at least one of the substrates constituting the liquid crystal cell serves also as the birefringent layer.

4. A device according to claim 1, wherein a protection film for the polarizer serves also as the birefringent layer.

* * * * *